United States Patent
Clement et al.

(10) Patent No.: US 11,007,819 B2
(45) Date of Patent: *May 18, 2021

(54) CROWN REINFORCEMENT FOR A TIRE FOR A HEAVY-GOODS VEHICLE USED IN CIVIL ENGINEERING

(71) Applicant: COMPAGNIE GENERALE DES ETABLISSEMENTS MICHELIN

(72) Inventors: Emmanuel Clement, Clermont-Ferrand (FR); Alain Domingo, Clermont-Ferrand (FR); Elodie Le Chenadec, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 331 days.

This patent is subject to a terminal disclaimer.

(21) Appl. No.: 15/780,791

(22) PCT Filed: Nov. 24, 2016

(86) PCT No.: PCT/FR2016/053066
§ 371 (c)(1),
(2) Date: Jun. 1, 2018

(87) PCT Pub. No.: WO2017/093637
PCT Pub. Date: Jun. 8, 2017

(65) Prior Publication Data
US 2020/0247187 A1     Aug. 6, 2020

(30) Foreign Application Priority Data
Dec. 4, 2015 (FR) ...................... 1561856

(51) Int. Cl.
*B60C 9/20* (2006.01)
*B60C 9/22* (2006.01)
(Continued)

(52) U.S. Cl.
CPC .......... *B60C 9/2006* (2013.01); *B60C 9/2009* (2013.01); *B60C 9/22* (2013.01);
(Continued)

(58) Field of Classification Search
CPC ................ B60C 9/28; B60C 2009/209; B60C 2200/065; B60C 9/22; Y10T 152/1081
See application file for complete search history.

(56) References Cited

U.S. PATENT DOCUMENTS 3,786,851 A * 1/1974 Mirtain ................ B60C 9/22
                                                        152/527
5,843,583 A    12/1998 D'Haene et al.
(Continued)

FOREIGN PATENT DOCUMENTS

FR      2 419 182        10/1979
WO    WO 2005/014925    2/2005
(Continued)

*Primary Examiner* — Robert C Dye
*Assistant Examiner* — Farah Taufiq
(74) *Attorney, Agent, or Firm* — Cozen O'Connor

(57) ABSTRACT

The invention relates to a tire for a heavy vehicle of construction plant type, comprising a working reinforcement (50), a protective reinforcement (60) and a hoop reinforcement (70). The working reinforcement (50) comprises two layers (51, 52) comprising inelastic metallic reinforcers that are crossed and make angles of between 30° and 35° with the circumferential direction, and having a force at break greater than 2500 daN. The hoop reinforcement (70) is formed by a circumferential winding forming two layers (71, 72), radially positioned between the working layers (51, 52), comprising circumferential elastic metallic reinforcers, having a force at break greater than 800 daN. The metallic reinforcers of the protective layers (61, 62) are potentially identical to the reinforcers of the hoop reinforcement, crossed from one layer to another with angles identical to the working layers.

(Continued)

These reinforcers are elastic, have a diameter greater than 3 mm and a force at break greater than 800 daN.

10 Claims, 4 Drawing Sheets

(52) U.S. Cl.
CPC ...... *B60C 2009/209* (2013.01); *B60C 2009/2016* (2013.01); *B60C 2009/2051* (2013.01); *B60C 2009/2077* (2013.01); *B60C 2200/06* (2013.01)

(56) References Cited

U.S. PATENT DOCUMENTS

| | | | |
|---|---|---|---|
| 2006/0169383 | A1 | 8/2006 | Radulescu |
| 2010/0294413 | A1* | 11/2010 | Johnson ............... B29C 35/00 152/556 |
| 2012/0227885 | A1* | 9/2012 | Cheng ............... D07B 1/0613 152/451 |
| 2015/0251497 | A1* | 9/2015 | Ferlin ............... B60C 9/0007 152/535 |

FOREIGN PATENT DOCUMENTS

| | | |
|---|---|---|
| WO | WO 2007/090603 | 8/2007 |
| WO | WO 2009/033977 | 3/2009 |
| WO | WO 2014/048897 | 4/2014 |
| WO | WO 2014/095957 | 6/2014 |

\* cited by examiner

CROWN REINFORCEMENT FOR A TIRE FOR A HEAVY-GOODS VEHICLE USED IN CIVIL ENGINEERING

RELATED APPLICATIONS

This is a U.S. National Phase Application under 35 USC 371 of International Application PCT/FR2016/053066 filed on Nov. 24, 2016.

This application claims the priority of French application no. 1561856 filed Dec. 4, 2015, the entire content of which is hereby incorporated by reference.

FIELD OF THE INVENTION

The present invention relates to a tire for a heavy vehicle of construction plant type, and more particularly to the crown of such a tire.

Although not restricted to this type of application, the invention is described more particularly with reference to a radial tire of large size intended to be mounted, for example, on a dumper, a vehicle for transporting materials extracted from quarries or open cast mines. The nominal diameter of the rim of such a tire, within the meaning of the European Tire and Rim Technical Organisation (ETRTO) standard, is at least equal to 25 inches.

BACKGROUND OF THE INVENTION

Since a tire has a geometry that exhibits symmetry of revolution about an axis of rotation, the geometry of the tire is generally described in a meridian plane containing the axis of rotation of the tire. For a given meridian plane, the radial, axial and circumferential directions denote the directions perpendicular to the axis of rotation of the tire, parallel to the axis of rotation of the tire and perpendicular to the meridian plane, respectively. The plane perpendicular to the axis of rotation of the tire and passing through its centre of gravity is known as the equatorial plane.

In the following text, the expressions "radially on the inside of" and "radially on the outside of" mean "closer to the axis of rotation of the tire, in the radial direction, than" and "further away from the axis of rotation of the tire, in the radial direction, than", respectively. The expressions "axially on the inside of" and "axially on the outside of" mean "closer to the equatorial plane, in the axial direction, than" and "further away from the equatorial plane, in the axial direction, than", respectively. A "radial distance" is a distance with respect to the axis of rotation of the tire and an "axial distance" is a distance with respect to the equatorial plane of the tire. A "radial thickness" is measured in the radial direction, an "axial width" is measured in the axial direction, and a "circumferential length" is a length of a circular arc in the circumferential direction.

A tire comprises a crown comprising a tread that is intended to come into contact with the ground via a tread surface, two beads that are intended to come into contact with a rim, and two sidewalls that connect the crown to the beads. A radial tire, as generally used for a vehicle of construction plant type, more particularly comprises a radial carcass reinforcement and a crown reinforcement, as described, for example, in the document WO2014-095957.

The carcass reinforcement of a radial tire for a heavy vehicle of construction plant type usually comprises at least one carcass layer comprising generally metallic reinforcers coated in an elastomeric material known as a coating compound. The carcass layer comprises a main part, joining the two beads together and wrapped, in each bead, from the inside of the tire to the outside around a generally metallic circumferential reinforcing element known as a bead wire so as to form a turn-up. The metallic reinforcers of a carcass layer are substantially parallel to one another and make an angle of between 85° and 95° with the circumferential direction.

The crown reinforcement of a radial tire for a heavy vehicle of construction plant type comprises a superposition of circumferentially disposed crown layers radially on the outside of the carcass reinforcement. Each crown layer comprises generally metallic reinforcers that are mutually parallel and coated in an elastomeric material or coating compound.

The crown reinforcement comprises at least one working reinforcement comprising at least two working layers, radially on the outside of the carcass reinforcement and radially on the inside of the tread. These working layers are superposed and formed by reinforcers or cords that are parallel in each layer and crossed from one layer to the next, making angles of between 10° and 45° with the circumferential direction. Their respective axial widths are at least equal to two-thirds of the maximum axial width of the tire. The maximum axial width of the tire is measured at the sidewalls, the tire being mounted on its rim and lightly inflated, i.e. inflated to a pressure equal to 10% of the nominal pressure as recommended, for example, by the Tire and Rim Association or TRA. The working reinforcement, which comprises at least two working layers, has the function of belting the tire and conferring stiffness and road holding on the tire. The working reinforcement absorbs both mechanical stresses of inflation, which are generated by the tire inflation pressure and transmitted by the carcass reinforcement, and mechanical stresses caused by running, which are generated as the tire runs over the ground and are transmitted by the tread. It should also be resistant to oxidation, impacts and perforations.

Said working layers, forming the working reinforcement, may be radially on the inside of a protective reinforcement comprising at least one layer known as a protective layer and formed by generally metallic and extensible or elastic reinforcers. In the case of a tire for a heavy vehicle of construction plant type that is intended to run over uneven ground, the presence of a protective reinforcement comprising at least one protective layer is advantageous. It essentially protects the working layers from mechanical or physicochemical attack, likely to spread through the tread radially towards the inside of the tire. In the case of multiple protective layers, it is advantageous for the reinforcers to be crossed from one layer to the next and for the reinforcers of the radially innermost protective layer to be crossed with the inextensible reinforcers of the radially outermost working layer adjacent to said radially innermost protective layer.

The crown reinforcement may also comprise a layer of inelastic metallic reinforcers that make an angle of between 45° and 90° with the circumferential direction. This layer, known as the triangulation layer, is radially on the outside of the carcass reinforcement and radially on the inside of the radially innermost working layer, comprising mutually parallel reinforcers that form an angle at least equal to 45° in absolute terms with the circumferential direction. The triangulation layer forms a triangulated reinforcement with at least said working layer and has the essential role of absorbing the transverse compressive forces to which the reinforcers are subjected in the region of the crown of the tire. This type of crown architecture comprising triangulation, working and protective layers implies a flexible crown that is subject to significant deformation at the equatorial plane and the shoulders on inflation, that is to say at the axial ends of the tread. The flexibility at the equatorial plane allows the crown to deform without failing when the vehicle is driven over an obstacle with a size, for example, in the order of magnitude of the deflection of the tire under its nominal load. Deflection is understood to be the variation in radius at the midpoint of the tread surface, in the equatorial plane, when the tire passes from an unloaded inflated state to a loaded inflated state under its nominal load.

By contrast, with this abovementioned crown architecture, during running, this same flexibility at the shoulder results in a high level of deformation of the elastomeric materials present in the crown, generating a high temperature of said elastomeric materials. At the temperatures that are reached, the elastomeric materials of the crown lose some of their resistance to cracking, making the crown less durable. This cracking of the elastomeric materials may, in extreme cases, result in the separation of the working layers, known as cleavage of the crown.

The third parameter of the performance of the crown is associated with the tensile breaking strength and shear strength of the protective layers, which may take place during impacts with rigid objects.

In order to solve the problem of crown endurance, it is known, from the document FR 2419182, that tires for a heavy vehicle of the construction plant type can comprise one or more narrow reinforcing layers radially on the outside of the carcass reinforcement and radially on the inside of the working reinforcement, centred about the equatorial plane. These layers are known as narrow hooping layers and have the function of limiting the radial deformation of the tire on inflation. This limiting allows a reduction in the deformation of the crown during flattening under the effect of the load and thus a reduction in the temperature, allowing an improvement in the endurance performance with regard to cleavage of the crown. Narrow hooping layers are understood to be layers having an axial width less than 0.6 times the axial width of the radially innermost working layer. These narrow hooping layers comprise generally metallic inextensible reinforcers which form angles of greater than 6° and less than 12° with the circumferential direction. The respective reinforcers of these narrow hooping layers are crossed from one layer to the next in order to ensure greater stiffness at the crown and better endurance with regard to cleavage of the crown.

However, this solution has three drawbacks. The first drawback relates to the manufacturing of the narrow hooping layers and the laying thereof for tires for a heavy vehicle of the construction plant type of large size. Specifically, for tires with a diameter greater than 3 m and a width of greater than 0.8 m, manufacturing a narrow hooping layer, the reinforcers of which form an angle of around 8° with the circumferential direction, means cutting narrow hooping layers along a cutting length of greater than 2.5 m, i.e. outside the range of commercial industrial machines, and of welding the narrow hooping layer to the tire before curing along this same length, this requiring know-how and precision close to double that of laying the working or protective layers.

The second drawback is sensitivity of the tire to impacts associated with the presence of obstacles on tracks with a height in the order of the magnitude of the deflection of the tire under its nominal load. Specifically, in the event of an impact, these very stiff narrow hooping layers that are at a distance from the neutral axis of the crown undergo significant imposed deformation, resulting in damage to or breaking of the crown reinforcement, causing failure of the tire. It is not possible to move this type of hooping layer closer to the neutral axis on account of the need, at the very least, for the tire to be able to be deformed during pressing thereof. This in fact makes it possible to create tread pattern elements of the tire tread by the tire being pressed in the mould. It is also not possible to further open the angles in order to make the crown more flexible at the risk of losing the benefit of endurance with regard to cleavage of the crown gained from stiffening the crown.

The third drawback is associated with the too-low breaking strength of the protective layers. In order not to decrease the performance of the crown in terms of cleavage, it is not possible to increase the diameter of the reinforcers of the protective layers and thus the strength thereof. This is because stronger reinforcers have a larger diameter and take up a greater volume and thus result in an increase in the operating temperature and a reduction in the performance in terms of cleavage.

In order to solve this problem of sensitivity to impacts of crowns comprising narrow hooping layers, the documents WO 2014048897 and WO 2014095957 propose the use either of elastic narrow hooping layers or of inelastic narrow hooping layers associated with a first working layer, the angle of the reinforcers of which is at least equal to 50°. However, even though they improve the impact resistance of the crown, these solutions do not ensure its mechanical integrity under all circumstances, given the dimensions of some obstacles that are encountered at the sites at which the tires are used and the characteristics of the protective layers.

SUMMARY OF THE INVENTION

One object of the invention is to improve both the endurance performance with regard to cleavage and the impact resistance of the crown of a tire for a heavy vehicle of construction plant type.

This object is achieved according to one aspect of the invention by a tire for a heavy vehicle of construction plant type comprising:
 a tread that is intended to come into contact with the ground,
 a radial carcass reinforcement radially on the inside of the tread and comprising at least one carcass layer,
 a crown reinforcement, radially on the inside of the tread and radially on the outside of the radial carcass reinforcement, and comprising a working reinforcement, a hoop reinforcement and a protective reinforcement,
 the working reinforcement comprising at least two working layers, each comprising inelastic metallic reinforcers that are crossed from one working layer to the next and make angles at least equal to 30° and at most equal to 35° with the circumferential direction,
 the hoop reinforcement being formed by a circumferential winding of a ply comprising circumferential elastic metallic reinforcers that make angles at most equal to 2.5° with the circumferential direction, said circumferential winding of the ply extending from a first circumferential end to a second circumferential end radially on the outside of the first circumferential end, so as to form a radial stack of at least two hooping layers,
 the protective reinforcement comprising at least two protective layers made up of metallic reinforcers that are crossed from one protective layer to the next and make angles at least equal to 20° and at most equal to 40° with the circumferential direction, the metallic reinforcers of the protective layers being elastic, having a diameter at least equal to 3 mm, and a force at break at least equal to 800 daN, the metallic reinforcers of the working layers having a force at break at least equal to 2500 daN, the hoop reinforcement being radially positioned between the working layers, the circumferential metallic reinforcers of the hoop reinforcement having a force at break at least equal to 800 daN.

Specifically, such an architecture makes it possible, by virtue of the use of circumferential reinforcers situated close to the neutral axis of the crown, to limit the deformation of the crown at the shoulders to a level similar to deformation of the crown at the shoulders that is obtained in the case of an architecture according to the prior art, comprising narrow hooping layers. This therefore makes it possible to obtain both the expected endurance performance with regard to cleavage of the crown and the intended impact resistance performance by virtue of a crown that is flexible at the centre and is able to tolerate the deformation due to impacts when the vehicle is driven over obstacles.

Specifically, when passing over an obstacle, the crown of the tire acts as a beam, the neutral axis of which is situated between the working layers depending on the type of deformation imposed. The neutral axis of bending of the crown reinforcement is situated between the stiffest crown layers, i.e. between the inelastic working layers. By positioning the circumferential reinforcers between said working layers, the solution minimizes the stresses and bending deformations associated with this loading that the circumferential reinforcements should tolerate.

The use of the hoop reinforcers also makes it possible to increase the angles of the working layers and thus to lower the temperature, and/or to use, for the protective layers, reinforcers with a larger diameter and thus greater breaking strength.

According to one embodiment of the invention, the hoop reinforcement is formed by a circumferential winding of a ply. The circumferential winding of a ply is advantageous compared with the circumferential winding of a reinforcer or of a strip made up of several reinforcers, for example 10 reinforcers, this type of winding conventionally being used for tires for passenger vehicles or heavy goods vehicles. This conventional winding solution would have a prohibitive cost on account of the size of the tires for a heavy vehicle of construction plant type. Specifically, the perimeter and also the laying width and the mass of the tire require, during the laying of these circumferential reinforcers, a speed of rotation of the tire that is much lower so as to avoid any deformation of the green tire, that is to say the tire before curing, under the effect of the centrifugal force. This solution would consequently result in a prohibitive operating time. Moreover, such a solution would stiffen the crown excessively, not solving the problem of endurance with regard to impacts.

As regards the metallic reinforcers, a metallic reinforcer is characterized mechanically by a curve representing the tensile force (in N) applied to the metallic reinforcer as a function of the relative elongation (in %) of the metallic reinforcement, known as the force-elongation curve. Mechanical tensile characteristics, such as the structural elongation $A_s$ (in %), the total elongation at break $A_t$ (in %), the force at break $F_m$ (maximum load in N) and the breaking strength $R_m$ (in MPa) are derived from this force-elongation curve, these characteristics being measured in accordance with the standard ISO 6892 of 1984.

The total elongation at break $A_t$ of the metallic reinforcer is, by definition, the sum of the structural, elastic and plastic elongations thereof ($A_t=A_s+A_e+A_p$). The structural elongation $A_s$ results from the relative positioning of the metallic threads making up the metallic reinforcer under a low tensile force. The elastic elongation $A_e$ results from the actual elasticity of the metal of the metallic threads, making up the metallic reinforcer, taken individually (Hooke's law). The plastic elongation $A_p$ results from the plasticity (irreversible deformation beyond the yield point) of the metal of these metallic threads taken individually. These different elongations and the respective meanings thereof, which are well known to a person skilled in the art, are described, for example, in the documents U.S. Pat. No. 5,843,583, WO 2005014925 and WO2007090603.

Also defined, at any point on the force-elongation curve, is a tensile modulus (in GPa) which represents the gradient of the straight line tangential to the force-elongation curve at this point. In particular, the tensile modulus of the elastic linear part of the force-elongation curve is referred to as the elastic tensile modulus or Young's modulus.

Among the metallic reinforcers, a distinction is usually made between the elastic metallic reinforcers, such as the ones generally used in the protective layers, and the inelastic metallic reinforcers, such as the ones generally used in the working layers.

An elastic metallic reinforcer is characterized by a structural elongation $A_s$ at least equal to 1% and a total elongation at break $A_t$ at least equal to 4%. Moreover, an elastic metallic reinforcer has an elastic tensile modulus usually between 40 GPa and 150 GPa.

An elastic or inelastic metallic reinforcer is characterized by a relative elongation, under a tensile force equal to 10% of the force at break $F_m$, at most equal to 0.2%. Moreover, an inelastic metallic reinforcer generally has an elastic tensile modulus usually between 150 GPa and 200 GPa.

The elastic metallic reinforcers of the protective layers make it possible to tolerate local deformations imposed when driving over obstacles. According to the invention, they have a diameter at least equal to 3 mm and a force at break at least equal to 800 daN. The high value of the diameter makes it possible to absorb the deformations in shear of the protective layer over a greater thickness, this generating lower shear stresses. The high value of the force at break allows the reinforcer to tolerate higher breaking stresses, thereby improving the performance of the crown in terms of endurance with regard to impacts.

The metallic reinforcers of the working layers have a force at break at least equal to 2500 daN, this ensuring a safety coefficient with regard to breaking and satisfactory fatigue strength. Preferably, the reinforcers of the entire crown reinforcement and in particular of the protective layers are penetrated by rubbery compound. This can be carried out at any time during the production of the tire, for example during the production of the reinforcer, during the laying of the reinforcer on the tire before curing, or during the moulding of the tire. This property improves the corrosion resistance of the reinforcers of the working layers and of the entire crown by preventing the propagation in the reinforcer of corrosive elements, and also the fatigue strength of the reinforcers by avoiding rubbing of the components of the reinforcers against one another.

The circumferential reinforcers of the hoop reinforcement are reinforcers which make angles in the range [−2.5°, +2.5°] with the circumferential direction. They are elastic so as to allow the expansion of the laying diameter resulting from the curing of the tires in a mould. Specifically, a tire is generally obtained through the laying of the different elements that make it up at initial specific diameters. The tire is then disposed in a curing mould with a diameter greater than the maximum diameter of the tire before curing, in which the elastomeric materials are vulcanized by the effect of heat. To this end, the tire is pressurized in the mould and all of the elements that make it up assume a diameter greater than their initial specific diameter. For all of the working layers, the carcass layers, the protective layers, the reinforcers of which are not circumferential, this change in diameter takes place by deformation of the coating compound on the different reinforcers. For the layers of circumferential reinforcers of the hoop reinforcement, this circumferential extension is allowed by the reinforcers which are elastic with a structural elongation at least equal to the extension due to moulding.

Moreover, the circumferential reinforcers of the hoop reinforcement have a force at break at least equal to 800 daN in order to be able to withstand tensile forces brought about by the tire passing over obstacles encountered during use.

A preferred solution is that the circumferential metallic reinforcers of the hoop reinforcement and of the protective layers are of the same kind. The kind of reinforcers is understood to mean that their constituents, methods of manufacture, geometries are identical. Specifically, the standardization of the constituents of the tire is a means for lowering the manufacturing costs.

Advantageously, the circumferential metallic reinforcers of the hoop reinforcement or of the protective layers have a modulus of elasticity at 10% elongation at least equal to 70 GPa and at most equal to 130 GPa in order to tolerate the deformations imposed on passing over obstacles for use in civil engineering.

Preferably, the metallic reinforcers of the protective layers make angles with the circumferential direction that have an absolute value substantially equal to the angle of the metallic reinforcers of the working layers with the circumferential direction. "Substantially equal" means equal to within the manufacturing variation, i.e. a difference in angle less than 2° in absolute terms. These angles are measured at the equatorial plane on a tire from which the tread and the plies radially on the outside of the one of which the angle is intended to be measured have been removed. In this case, the angle chosen is an optimum for controlling the temperature at the crown at the axially outer end of the working layers and the protective layers and thus the performance of the crown in terms of cleavage, while having crown stiffness that allows good impact resistance of the crown.

It is advantageous for the circumferential ends of the ply making up the hoop reinforcement to make angles (A) at least equal to 25° with the axial direction. Such an angle makes it possible to avoid having the circumferential ends of the hoop reinforcement contained in a meridian plane and thus desensitizing the surrounding elastomeric materials to cracking. Specifically, since each circumferential reinforcer end of the hoop reinforcement is a potential zone of cracking of the surrounding elastomeric materials, these potential zones of cracking should not be concentrated in one and the same meridian plane so as to avoid the joining up of microcracks that can result in cracking that is damaging to the endurance of the tire. Furthermore, in the event of an impact, the stress is greatest in the meridian plane corresponding to the maximum deflection. This angle thus makes it possible to avoid a situation in which all the ends of the reinforcers and the elastomeric materials surrounding them are subjected to maximum stresses and deformations in the same meridian plane. In order to have one cutting setting for the hoop reinforcement being manufactured, the angles of each of the circumferential ends of the ply making up the hoop reinforcement with the axial direction are equal and of the same sign.

Preferably, the circumferential distance between the first and second circumferential ends of the hoop reinforcement is at least equal to 0.6 m and at most equal to 1.2 m. Specifically, the first and second circumferential ends of the hoop reinforcement are not contained in one and the same meridian plane and overlap over a circumferential portion of the periphery of the tire, in order to ensure that the hoop reinforcement is present around the entire periphery of the tire. The circumferential distance between the two circumferential ends of the hoop reinforcement is known as the length of overlap. The length of overlap is understood to be the minimum circumferential distance between the circumferential ends of the hoop reinforcement, measured in the equatorial plane, the circumferential plane passing through the middle of the tread. The fact that the length of overlap is greater than 0.6 m makes it possible, firstly, to avoid a situation in which no zone of the tire, under the effect of the change in diameter during curing, has one fewer layer of circumferential reinforcers between the working layers than the number of layers necessary for use, and, secondly, with each end of a reinforcer being a potential zone of cracking of the surrounding elastomeric materials, for these potential zones of cracking not to be concentrated in the same meridian plane, even at different radii. The fact that this length is limited to 1.2 m has the consequence of not increasing the cost of starting material of the solution, without any increase in endurance.

Preferably, the mean surface of the ply making up the hoop reinforcement, near the first circumferential end of the hoop reinforcement, makes an angle, measured in the equatorial plane, at most equal to 45° with the circumferential direction. To this end, one solution consists in disposing, along this end of the hoop reinforcement, a transverse strip of elastomeric materials of triangular cross section. This solution has the effect of reducing bending stresses in the reinforcers of the hoop reinforcement near the first, radially innermost, end of the hoop reinforcement. Specifically, at this end, the mean surface of the winding of the hoop reinforcement undergoes a variation in diameter equal to the diameter of the reinforcers of the hoop reinforcement. This variation in diameter takes place by bending of the cord, which it is advisable to limit in order to preserve the endurance of the crown. Furthermore, this solution, consisting of the laying of a transverse strip of elastomeric materials of triangular cross section, fills a cavity which otherwise fills with air before the tire is cured, this being able to cause holes in the elastomeric materials after curing, reducing the endurance of the tire.

For similar reasons, the mean surface of the working layer, near the second circumferential end of the hoop reinforcement, makes an angle, measured in the equatorial plane, at most equal to 45° with the circumferential direction. At this end of the hoop reinforcement, the working layer undergoes a variation in diameter equal to the diameter of the reinforcers of the hoop reinforcement, involving bending of the working layer. One solution is to also dispose along this end a transverse strip of elastomeric materials of triangular cross section in order to obtain the same technical effects as described above, namely the reduction in the bending stresses in the reinforcers of the working layer and the impossibility of trapping air at this location before the tire is cured.

In the preferred solution, the axial width of the hoop reinforcement is less than half the axial width of the tire, since, beyond this maximum width, the cycle of stresses, as the wheel turns, in the reinforcers of the hoop reinforcement results in significant fatigue of the reinforcers and a loss of endurance.

Preferably, the two working layers are coupled, in the axial direction, over a coupling portion having an axial width at least equal to 1.5% of the axial width of the tire. Specifically, the axial coupling of the working layers, axially on the outside of the axial ends of the reinforcers of the hoop reinforcement, allows a local increase in the stiffness of the crown and thus a reduction in deformations, whence a drop in the temperature and an improvement in the endurance with regard to cleavage of the crown.

It is also preferable for the two working layers to be coupled, in the axial direction, over a coupling portion having an axial width at most equal to 5% of the axial width of the tire. Beyond a particular coupling length, the working layers have to be decoupled again in order to reduce shear stresses in the elastomeric materials near the axial ends of the working layers.

Two layers of reinforcers, such as working layers for example, are said to be coupled at the axial ordinate in question if the radial distance between the geometric centres of two adjacent reinforcers of these two layers is less than 3 times the mean radius of the reinforcers in question. If this same distance is greater than 4 times this mean radius, the two layers of reinforcers in question are said to be decoupled.

In another preferred solution, the radial distance between the working layer, radially on the inside of the hoop reinforcement, and the carcass reinforcement, measured at the centre of the coupling portion of the two working layers, is at least equal to twice the radial distance between the working layer, radially on the inside of the hoop reinforcement, and the carcass reinforcement, measured in the equatorial plane. Specifically, one of the possible solutions for coupling the two working layers is to keep the radially innermost working layer at a laying radius close to its radius at the equatorial plane, and to fold the working layer radially outside the hoop reinforcement to the coupling radius. For a tire of construction plant type, the differences in radius between the working layers are such that folding the working layer radially outside the hoop reinforcement creates folds within said layer and moulding defects in the coupling zone. In order to limit the differences in radius of the two working layers between their radius at the equatorial plane and their radius in the coupling zone, it is advisable to increase the distance of the radially innermost working layer from the radially outermost carcass layer, in the coupling zone, with respect to this same distance from the equatorial plane.

It is also advantageous for the modulus of elasticity at 10% elongation of a first elastomeric material, radially on the inside and in contact with the coupling portion of the working layers, to be at least equal to the modulus of elasticity at 10% elongation of a second elastomeric material, axially on the outside and in contact with the first elastomeric material. The coupling zone of the working layers is a zone stiffer than the decoupling zone axially on the outside thereof. Depending on use and the shear stresses in the adjacent elastomeric material radially on the inside of the coupling zone, known as the first material, it may be preferred to provide a stiffness gradient between the axially outer elastomeric material, known as the second material, and the elastomeric material coating the adjacent working layer radially on the outside, known as the calendering layer, and in this case the modulus of elasticity at 10% elongation of the first elastomeric material is greater than or equal to the modulus of elasticity at 10% elongation of the second material.

It may also be advantageous for the modulus of elasticity at 10% elongation of a first elastomeric material, radially on the inside and in contact with the coupling portion of the working layers, to be at least equal to the modulus of elasticity at 10% elongation of an elastomeric material coating the metallic reinforcers of the working layer, radially on the inside of the hoop reinforcement. This makes it possible to provide the greatest possible stiffness of the coupling zone, while avoiding a difference in stiffness between the calendering compound of the adjacent working layer and the first material and thus the stresses associated with any discontinuity of stiffness. In this case, the modulus of elasticity at 10% elongation of the first material is equal to the modulus of elasticity at 10% elongation of the calendering compound of the working layer.

Advantageously, at the axial ends of the hooping layers, the mean surfaces of the working layers make angles at most equal to 45° with the axial direction. Specifically, it is advantageous for the working layers not to be deformed while the tire is being manufactured, in order not to induce bending stresses in their reinforcers. The mean surfaces of the working layers which make an angle close to 0° with the axial direction in the part axially on the inside of the end of the circumferential reinforcers will preferably meet the coupling zone at an angle of less than 45°. This geometry can be obtained by the laying of a strip of elastomeric material at the axial end of the layers of circumferential reinforcers of triangular cross section.

Further advantageously, the modulus of elasticity at 10% elongation of an elastomeric material, axially contained between each axial end of the hoop reinforcement and the coupling portion of the working layers, is equal to the modulus of elasticity at 10% elongation of the elastomeric material coating the metallic reinforcers of the working layers, in order to avoid discontinuities of stresses linked to the changes in stiffness of the elastomeric materials.

It is particularly advantageous for the width of a portion of the working layer, radially on the inside of the hoop reinforcement and axially contained between the outer axial end of the coupling portion and the outer axial end of said working layer, to be at most equal to half the axial width of the hoop reinforcement. Specifically, given the presence of elastomeric materials of different stiffnesses implying the presence of stresses at their boundaries, such as, inter alia, those of the tread, it is advisable to limit the movements of the axial ends of the working layers. For this purpose, it is advantageous to limit the width of their decoupled parts in order to improve the endurance with regard to cleavage of the tire.

It is likewise advantageous for the axial width of the portion of the working layer, radially on the outside of the hoop reinforcement and axially contained between the outer axial end of the coupling portion and the outer axial end of said working layer, to be at most equal to the width of the portion of the working layer, radially on the inside of the hoop reinforcement and axially contained between the outer axial end of the coupling portion and the outer axial end of said working layer, in order to limit the movements of the axial ends of the working layers so as to improve the endurance with regard to cleavage of the tire.

BRIEF DESCRIPTION OF THE DRAWINGS

Further details and advantageous features of the invention will become apparent in the following from the description of the exemplary embodiments of the invention, with reference to FIGS. 1 to 7, in which.

In order to make them easier to understand, the figures are not shown to scale. The figures show only a partial view of a tire which extends substantially symmetrically with respect to the axis XX' that represents the circumferential median plane, or equatorial plane, of a tire. Substantially symmetrical means symmetrical within the variations due to manufacturing, that is to say with a precision of around ±3%. In the present case, the crown architecture of the invention is compatible with asymmetrical sidewalls or beads.

Figure 1:
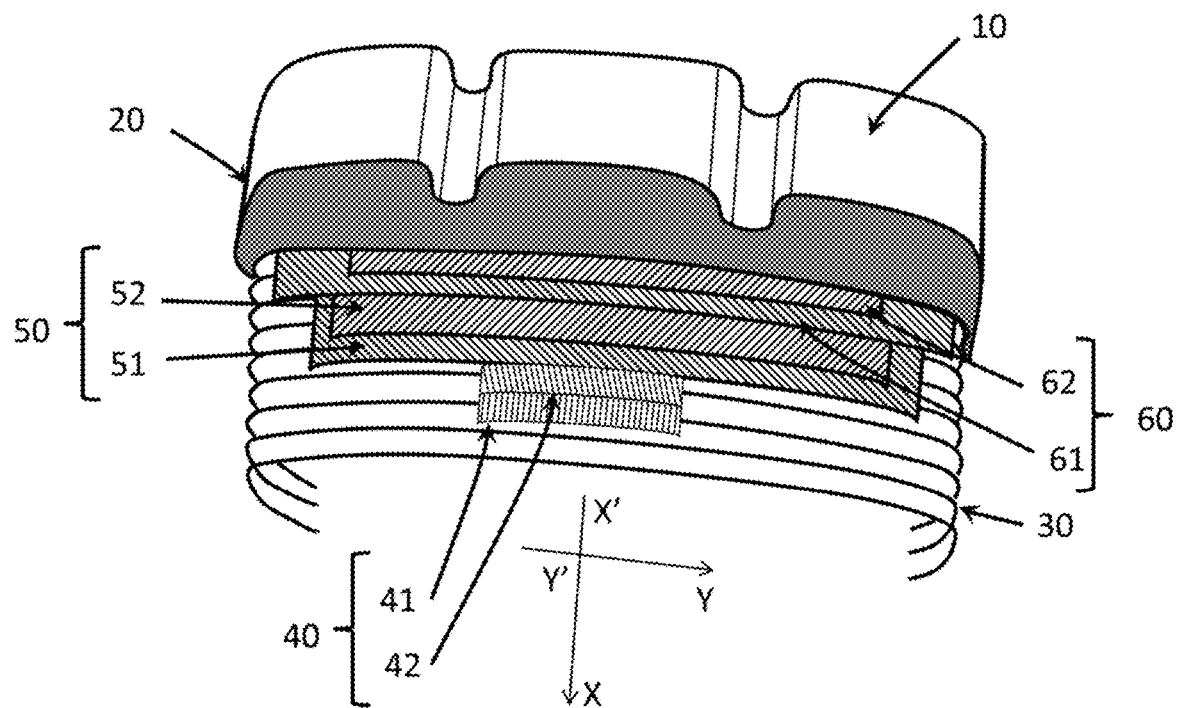
FIG. 1 shows a cutaway perspective view of the crown of a tire according to the prior art.

FIG. 1 shows a cutaway perspective view of the crown of a tire according to the prior art, having:
  a tread 10,
  sidewalls 20,
  a carcass reinforcement 30 comprising a carcass layer, the reinforcers of which form an angle of close to 90° with the circumferential direction XX',
  a hoop reinforcement 40 comprising two hooping layers 41 and 42, the reinforcers of which respectively form angles of 8° to 15° with the circumferential direction XX',
  a working reinforcement 50 comprising two working layers 51 and 52 and radially on the outside of the hoop reinforcement 40,
  a protective reinforcement 60 comprising two protective layers 61 and 62.

Figure 2:
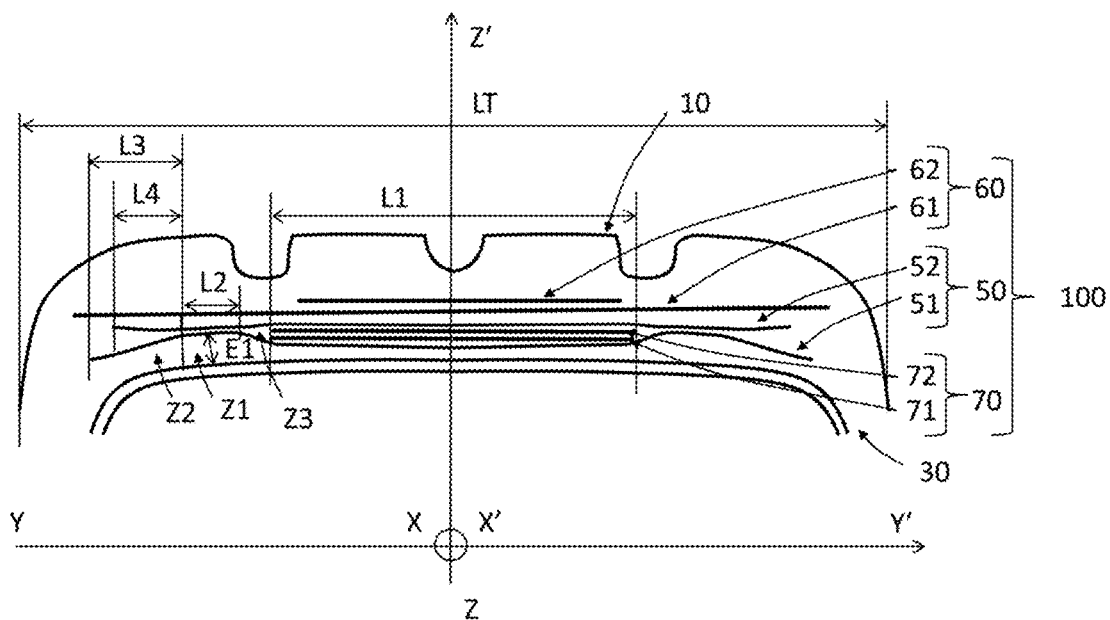
FIG. 2 shows a meridian section through the crown of a tire according to an embodiment of the invention.

FIG. 2 shows a meridian section through the crown of a tire according to the invention, having:
  a tread 10,
  a carcass reinforcement 30,
  a crown reinforcement 100 comprising a working reinforcement 50 comprising two working layers 51 and 52, a hoop reinforcement 70 comprising a winding of two turns of circumferential reinforcers 71 and 72 having an axial width L1 and a protective reinforcement 60 comprising two protective layers 61 and 62,
  a coupling zone of the working layers 51 and 52, having an axial width L2,
  a free end portion of the radially inner working layer 51 having an axial width L3,
  a free end portion of the radially outer working layer 52 having an axial width L4,
  a first elastomeric compound Z1, radially on the inside of the coupling zone of the working layers 51 and 52 and having a maximum radial thickness E1,
  a second elastomeric compound Z2, radially on the inside of the radially inner working layer 51 and axially on the outside of the coupling zone of the working layers 51 and 52,
  a third elastomeric compound Z3, radially contained between the working layers 51 and 52 and axially contained between the hoop reinforcement 40 and the coupling zone of the working layers 51 and 52.

Figure 3:
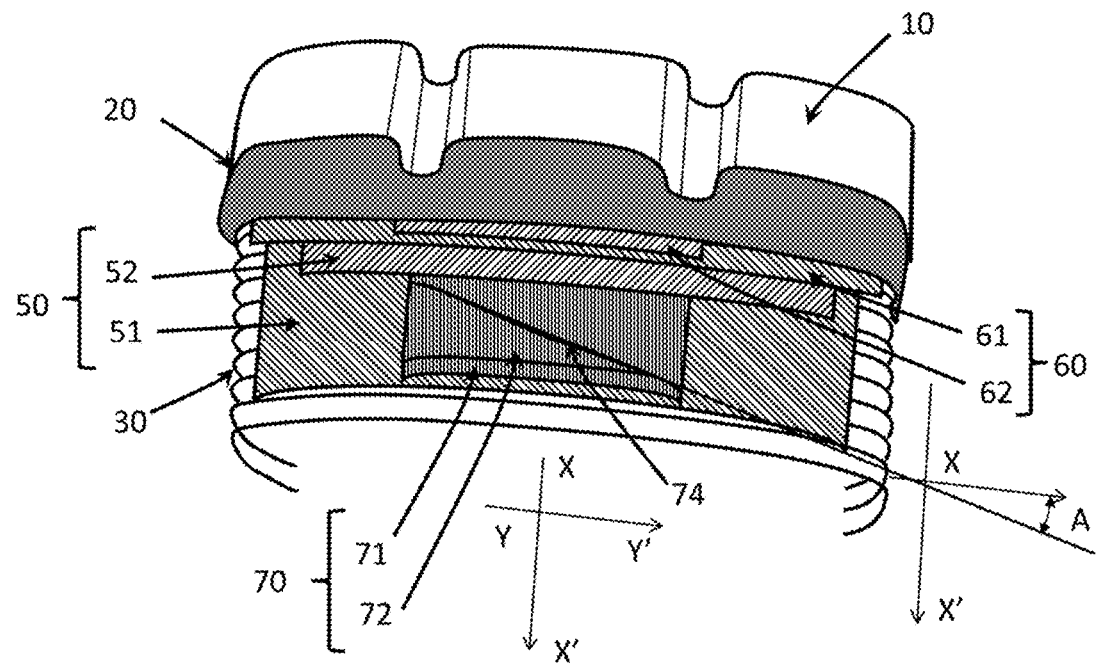
FIG. 3 shows a cutaway perspective view of the crown of a tire according to an embodiment of the invention.

FIG. 3 shows a cutaway perspective view of the crown of a tire according to the invention. It differs essentially from FIG. 1, showing the prior art, by way of a hoop reinforcement 70 comprising a winding of two turns of circumferential reinforcers 71 and 72, the radially outermost circumferential end 74 of which makes an angle (A) with the axial direction.

Figure 4:
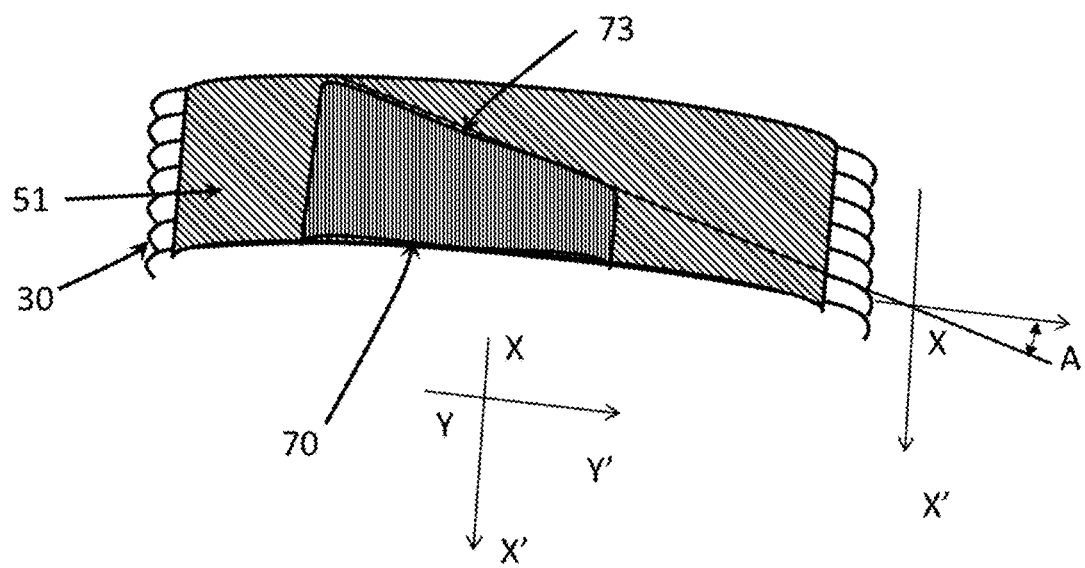
FIG. 4 shows a cutaway perspective and partial view of the crown of a tire according to an embodiment of the invention.

FIG. 4 shows a cutaway perspective and partial view of the crown of a tire according to the invention, notably having:
  the carcass reinforcement 30,
  the radially innermost working layer 51,
  the radially innermost circumferential end 73 of the hoop reinforcement 70 making an angle (A) with the axial direction.

Figure 5:
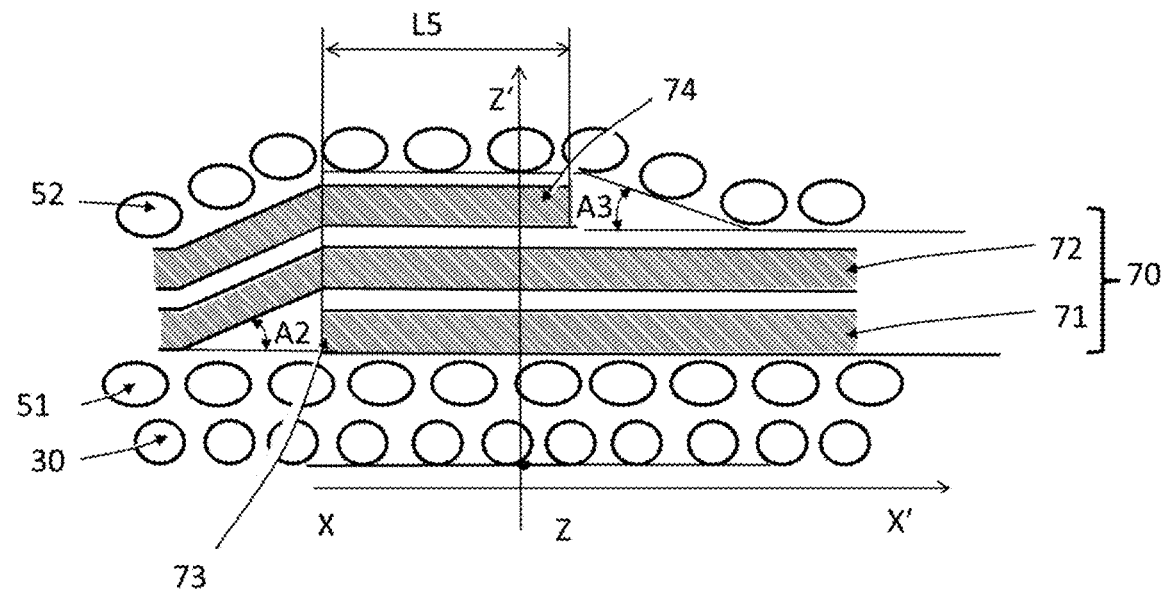
FIG. 5 shows a circumferential section, in the equatorial plane, of the portion of circumferential overlap of the hoop reinforcement 70.

FIG. 5 shows a circumferential section, in the equatorial plane, of the portion of circumferential overlap of the hoop reinforcement 70. In the main section, the hoop reinforcement 70 comprises a radial superposition of two layers 71 and 72. In the zone of overlap having a circumferential length L5, the hoop reinforcement comprises a radial superposition of three layers. At its radially inner first circumferential end 73, the hoop reinforcement 70 makes an angle A2 with the circumferential direction XX'. At the radially outer second circumferential end 74 of the hoop reinforcement 70, the radially outer working layer 52 makes an angle A3 with the circumferential direction XX'.

Figure 6:
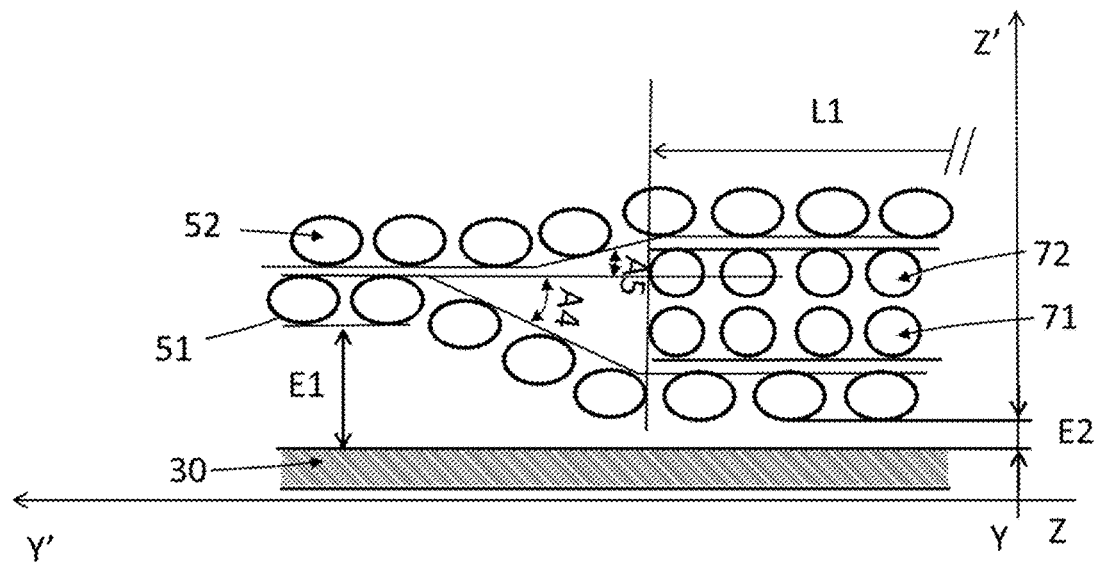
FIG. 6 shows a section through the crown, in a meridian plane, at the axial ends of the hooping layers 71 and 72.

FIG. 6 shows a section through the crown, in a meridian plane, at the axial ends of the hooping layers 71 and 72, where the radially inner 51 and radially outer 52 working layers make angles A4 and A5, respectively, with the axial direction YY'. It shows in particular the radial thickness E1 of the first elastomeric compound Z1, radially contained between the carcass reinforcement 30 and the radially innermost working layer 51 radially on the inside of the coupling zone of the working layers 51 and 52, and the radial thickness E2 of the elastomeric compound radially contained between the radially inner working layer and the carcass reinforcement 30, measured in the equatorial plane.

Figure 7:
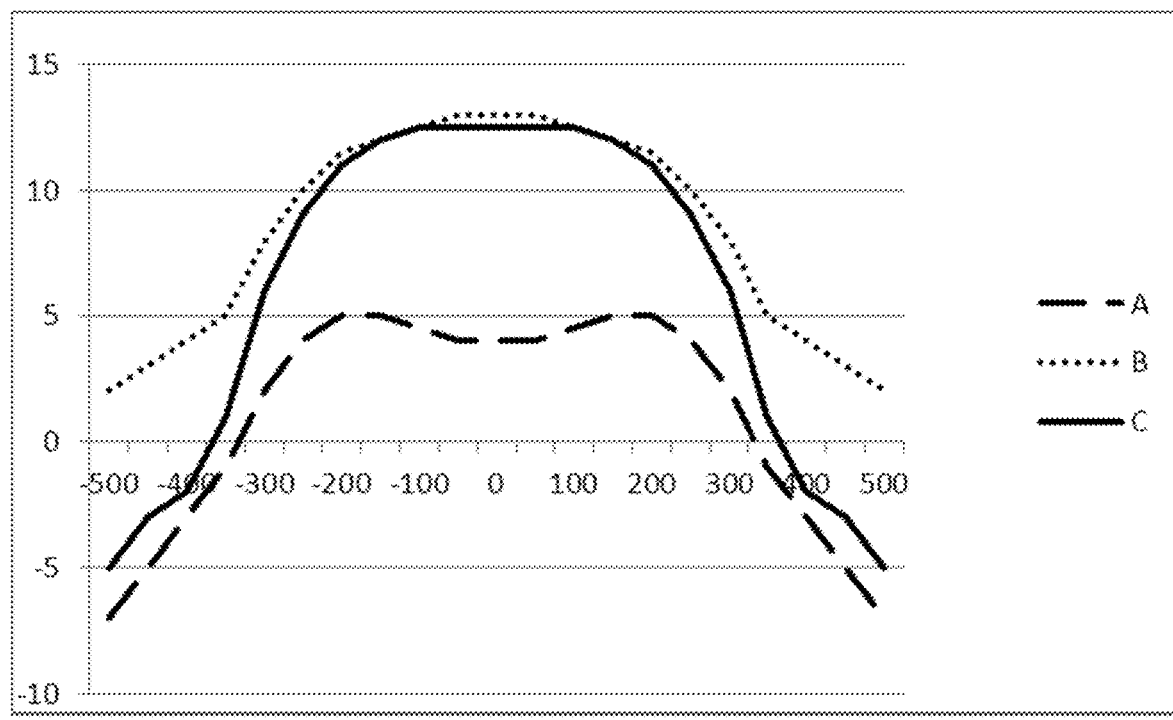
FIG. 7 shows the movements in mm of the points of the tread surface, which are situated in a meridian plane, during the inflation of the tire.

FIG. 7 shows the movements in mm of the points of the tread surface, which are situated in a meridian plane, during the inflation of the tire to the pressure recommended by the manufacturer in the three following cases:
  a prior art tire A comprising two narrow hooping layers, having the advantage of limiting the rising at the shoulders and thus the risk of cleavage of the working layers, but having the drawback of stiffening the centre, thereby making it sensitive to impacts,
  a prior art tire B without a hoop reinforcement, and thus with a crown that is flexible at the centre and has good impact resistance, but is also flexible at the shoulders, with the consequence of a high working temperature at the crown, which can lead to cleavage of the working layers,
  a tire C according to the invention comprising, radially from the outside to the inside:
  a protective reinforcement formed by protective layers, the elastic metallic reinforcers of which have a diameter equal to 3.8 mm and a force at break equal to 950 daN,
  a working reinforcement formed by working layers, the inelastic metallic reinforcers of which that are crossed from one working layer to the next form angles at least equal to 33° with the circumferential direction and have a force at break equal to 2500 daN, a hoop reinforcement formed by two hooping layers, radially positioned between the working layers, the circumferential metallic reinforcers of which have a force a break equal to 950 daN.

The invention has been realized on a tire for a heavy vehicle of construction plant type of the size 53/80R63, with a maximum axial width equal to 1345 mm. The reference tire, according to the prior art, is made up of a carcass layer having metallic reinforcers, of two narrow hooping layers with a width equal to 550 mm, having reinforcers that make an angle equal to 8° with the circumferential direction and are crossed from one layer to the next, of two working layers with respective widths equal to 900 mm and 1000 mm and having reinforcers that form respective angles equal to 33° and 19° with the circumferential direction, having a force at break equal to 1960 daN and two protective layers having reinforcers that have a diameter of 2 mm, a force at break of 255 daN and make an angle equal to 24° with the circumferential direction and are crossed from one layer to the next.

The tire according to the invention differs from the prior art tire by way of the working reinforcement having two working layers, the respective reinforcers of which make an angle equal to 33° with the circumferential direction, and the force at break of which is equal to 2530 daN, and by way of the hoop reinforcement and the protective reinforcement. Disposed between the working layers is the hoop reinforcement made up of the circumferential winding of two turns of a ply having an axial width equal to 520 mm and comprising elastic metallic circumferential reinforcers having a breaking strength equal to 950 daN and a modulus of elasticity equal to 90 GPa, these mechanical characteristics being measured on reinforcers extracted from the tire. The protective layers are made up of reinforcers of the same kind as the hooping layers and which make an angle equal to 33° with the circumferential direction. These reinforcers have a diameter of 3.8 mm.

The two working layers are coupled over an axial width of 30 mm. The radial distance between the carcass reinforcement and the radially innermost working layer is equal to 4.6 mm in the equatorial plane and is equal to 13 mm under the coupling zone of the working layers. The elastomeric materials of the different zones around the coupling zone are identical to the elastomeric material coating the reinforcers of the working layers. The length of the working layer radially on the inside of the hoop reinforcement, measured from the outer axial end of the coupling zone to the outer axial end of said working layer, is equal to 115 mm and the length of the working layer radially on the outside of the hoop reinforcement, measured from the outer axial end of the coupling zone to the outer axial end of said working layer, is equal to 70 mm.

The two architectures of the two tires were modelled by finished elements in order to evaluate the value of the deformations in shear between the axial end of the radially outermost working layer and the radially innermost working layer when rolling. The calculation is carried out by simulating a load of 90 t, a cornering force of 18 t for a pressure of 7 bar. With the chosen criterion, the solution makes it possible to decrease the amplitude of the deformation cycle as the wheel turns by close to 30% compared with the prior art. However, this value is directly correlated with the performance with regard to cleavage of the crown. Furthermore, the reinforcers of the working layers according to the invention are not subjected, for the same calculations, to any compressive force, unlike the tire according to the prior art, this being directly linked to the endurance performance of the crown. The evaluation of the internal temperature of the tire gives, for the invention, a temperature in the crown that is lower by around 2° C. compared with the tire according to the prior art, this being a known criterion for improving the integrity in terms of cleavage of tires.

The endurance performance with regard to cleavage of the crown is measured in tests on a dumper vehicle having 90 t of load per tire, inflated in the cold state to 6 bar and rolling for 640 hours at 17 km/h. Following this use, the tires are cut into 6 sectors, the tread is removed in order to extract the working layers and to detect any cracks present between these two layers. The endurance performance with regard to cleavage of the crown is estimated in proportion to the widths of the cleavage cracks. The tire according to the invention reveals a level of cleavage damage at least 20% lower than that for the tire according to the prior art.

For tires of this size, the crown impact resistance of the different versions of tires is tested directly in use at client premises. These in situ experiments have demonstrated that tires without a hoop reinforcement, which are more flexible at the crown, have better impact resistance than those that have narrow hooping layers in accordance with the prior art, while the latter are better in terms of endurance with regard to cleavage of the crown. The tire according to the invention exhibits both impact resistance at least equal to that of a tire without a hoop reinforcement and an improvement in cleavage of the crown of 30% compared with a tire comprising a hoop reinforcement according to the prior art.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

The invention claimed is:

1. A tire for a heavy vehicle of construction plant type, comprising:

a tread adapted to come into contact with the ground, a radial carcass reinforcement radially on the inside of the tread and comprising at least one carcass layer, a crown reinforcement, radially on the inside of the tread and radially on the outside of the radial carcass reinforcement, and comprising a working reinforcement, a hoop reinforcement and a protective reinforcement, the working reinforcement comprising at least two working layers, each comprising inelastic metallic reinforcers that are crossed from one working layer to the next and make angles at least equal to 30° and at most equal to 35° with the circumferential direction, the hoop reinforcement being formed by a circumferential winding of a ply comprising circumferential elastic metallic reinforcers that make angles at most equal to 2.5° with the circumferential direction, said circumferential winding of the ply extending from a first circumferential end to a second circumferential end radially on the outside of the first circumferential end, so as to form a radial stack comprising, in a main section of the hoop reinforcement, a radial superposition of two layers, and, in a zone of overlap having a circumferential length less than that of the tire, the hoop reinforcement comprises a radial superposition of three layers, the protective reinforcement comprising at least two protective layers comprised of metallic reinforcers that are crossed from one protective layer to the next and make angles at least equal to 20° and at most equal to 40° with the circumferential direction, wherein the metallic reinforcers of the protective layers are elastic, have a diameter at least equal to 3 mm and a force at break at least equal to 800 daN, wherein the metallic reinforcers of the working layers have a force at break at least equal to 2500 daN, wherein all of the layers of the radial superposition of the hoop reinforcement are radially positioned between two layers of the at least two working layers, wherein the circumferential metallic reinforcers of the hoop reinforcement have a force at break at least equal to 800 daN, and wherein a circumferential distance between the first and second circumferential ends of the hoop reinforcement is a least equal to 0.6 m and at most equal to 1.2 m.

2. The tire according to claim 1, wherein the circumferential metallic reinforcers of the hoop reinforcement and of the protective layers are of the same kind.

3. The tire according to claim 1, wherein the circumferential metallic reinforcers of the hoop reinforcement or of the protective layers have a modulus of elasticity at 10% elongation at least equal to 70 GPa and at most equal to 130 GPa.

4. The tire according to claim 1, wherein the metallic reinforcers of the protective layers make angles with the circumferential direction that have an absolute value substantially equal to the angle of the metallic reinforcers of the working layers with the circumferential direction.

5. The tire according to claim 1, wherein the axial width of the hoop reinforcement is less than half the axial width of the tire.

6. The tire according to claim 1, wherein the two working layers are coupled, in the axial direction, over a coupling portion having an axial width at least equal to 1.5% of the axial width (LT) of the tire.

7. The tire according to claim 1, wherein the two working layers are coupled, in the axial direction, over a coupling portion having an axial width at most equal to 5% of the axial width of the tire.

8. The tire according to claim 6, wherein the radial distance between the working layer, radially on the inside of the hoop reinforcement, and the carcass reinforcement, measured at the centre of the coupling portion of the two working layers, is at least equal to twice the radial distance between the working layer, radially on the inside of the hoop reinforcement, and the carcass reinforcement, measured in the equatorial plane.

9. The tire according to claim 6, wherein the width of a portion of the working layer that is radially on the inside of the hoop reinforcement and axially contained between the outer axial end of the coupling portion and the outer axial end of said working layer, is at most equal to half the axial width of the hoop reinforcement.

10. The tire according to claim 6, wherein the axial width of the portion of the working layer that is radially on the outside of the hoop reinforcement and axially contained between the outer axial end of the coupling portion and the outer axial end of said working layer, is at most equal to the width of the portion of the working layer, radially on the inside of the hoop reinforcement and axially contained between the outer axial end of the coupling portion and the outer axial end of said working layer.

* * * * *